United States Patent
Gakh

(10) Patent No.: US 11,139,483 B2
(45) Date of Patent: Oct. 5, 2021

(54) PULSED ALUMINUM BATTERY

(71) Applicant: Andrei A. Gakh, Bethesda, MD (US)

(72) Inventor: Andrei A. Gakh, Bethesda, MD (US)

(73) Assignee: Andrei A. Gakh, Bethesda, MD (US)

(*) Notice: Subject to any disclaimer, the term of this patent is extended or adjusted under 35 U.S.C. 154(b) by 0 days.

(21) Appl. No.: 17/034,166

(22) Filed: Sep. 28, 2020

(65) Prior Publication Data

US 2021/0104751 A1 Apr. 8, 2021

Related U.S. Application Data

(60) Provisional application No. 62/910,345, filed on Oct. 3, 2019.

(51) Int. Cl.
*H01M 4/86* (2006.01)
*H01M 4/90* (2006.01)
(Continued)

(52) U.S. Cl.
CPC ......... *H01M 4/8663* (2013.01); *H01M 4/248* (2013.01); *H01M 4/32* (2013.01); *H01M 4/463* (2013.01); *H01M 4/9016* (2013.01); *H01M 6/045* (2013.01); *H01M 12/06* (2013.01); *H01M 2004/8689* (2013.01); *H01M 2300/0014* (2013.01)

(58) Field of Classification Search
CPC .. H01M 4/8663; H01M 4/9016; H01M 4/248; H01M 12/06; H01M 6/045; H01M 4/32; H01M 4/463; H01M 2004/8689; H01M 2300/0014
See application file for complete search history.

(56) References Cited

U.S. PATENT DOCUMENTS 3,378,408 A 4/1968 Hamlen et al.
4,554,131 A 11/1985 Thompson et al.
(Continued)

FOREIGN PATENT DOCUMENTS

JP 4883260 2/2012

OTHER PUBLICATIONS

Elia, G. A., et al. "An Overview and Future Perspectives of Aluminum Batteries," Advanced Materials, V. 28, No. 35, 2016, pp. 7564-7579.

(Continued)

*Primary Examiner* — Stewart A Fraser

(57) ABSTRACT

Novel pulsed aluminum batteries (PAlBs), including power output regulated systems, have been developed. PAlBs comprise an aluminum anode, a cathode, and a complex electrolyte containing bases, facilitating and stabilizing agents, and may contain internal oxidizers. The aluminum anode comprises technical grade or recycled aluminum. The cathode may comprise copper, nickel, or platinum. Bases may comprise sodium or potassium hydroxide. Facilitating and stabilizing agents may comprise sodium and lithium chlorides or sulfates. Internal oxidizers may comprise sodium hypochlorite. Frequency of electric pulses in novel PAlBs can be controlled by electric or chemical means. PAlBs can be used as components of backup power systems, in unmanned aerial vehicles (UAVs), and in autonomous self-powered electrochemical computing systems and sensors.

18 Claims, 8 Drawing Sheets

(51) Int. Cl.
*H01M 4/24* (2006.01)
*H01M 12/06* (2006.01)
*H01M 6/04* (2006.01)
*H01M 4/32* (2006.01)
*H01M 4/46* (2006.01)

(56) References Cited

U.S. PATENT DOCUMENTS

| | | | |
|---|---|---|---|
| 5,549,991 A * | 8/1996 | Licht | H01M 12/04 |
| | | | 429/218.1 |
| 5,718,986 A | 2/1998 | Brenner | |
| 6,573,008 B1 | 6/2003 | Hasvold | |
| 8,709,635 B1 | 4/2014 | Benson et al. | |

OTHER PUBLICATIONS

Leisegang, T., et al. "The Aluminum-Ion Battery: A Sustainable and Seminal Concept?," Frontiers in Chemistry, V. 7, 2019, p. 268.

Hu, Y., et al. "Recent Progress and Future Trends of Aluminum Batteries," Energy Technology, V. 7, No. 1, 2019, pp. 86-106.

Shkolnikov, E. I., et al. "Aluminum as energy carrier: Feasibility analysis and current technologies overview," Renewable and Sustainable Energy Reviews, V. 15, No. 9, 2011, pp. 4611-4623.

Buff, H. "Ueber das electrische Verhalten des Aluminiums," Justus Liebigs Annalen der Chemie, V. 102, No. 3, 1857, pp. 265-284.

Li, Q., et al. "Aluminum as anode for energy storage and conversion: a review," Journal of Power Sources, V. 110, No. 1, 2002, pp. 1-10.

Ding, F., et al. "Aluminum-Air Batteries: Fundamentals and Applications." In: Neburchilov, V., Zhang, J., eds. Metal-Air and Metal-Sulfur Batteries: Fundamentals and Applications. Boca Raton, CRC Press, 2016, pp. 65-109.

Chen, L. D., et al. "Al-Air Batteries: Fundamental Thermodynamic Limitations from First-Principles Theory," The Journal of Physical Chemistry Letters, V. 6, No. 1, 2015, pp. 175-179.

Liu, Y., et al. "A comprehensive review on recent progress in aluminum-air batteries," Green Energy & Environment, V. 2, No. 3, 2017, pp. 246-277.

An, L., et al. "The dual role of hydrogen peroxide in fuel cells," Science Bulletin, V. 60, No. 1, 2015, pp. 55-64.

Hasvold, Ø., et al. "The alkaline aluminium/hydrogen peroxide power source in the Hugin II unmanned underwater vehicle," Journal of Power Sources, V. 80, No. 1, 1999, pp. 254-260.

Marsh, C., et al. "A Novel Aqueous Dual-Channel Aluminum-Hydrogen Peroxide Battery," Journal of The Electrochemical Society, V. 141, No. 6, 1994, pp. L61-L63.

Brenner, A. "Cells with Sodium Hypochlorite or Chlorite and Anodes of Magnesium or Aluminum," Journal of The Electrochemical Society, V. 143, No. 10, 1996, pp. 3133-3138.

Medeiros, M. G., et al. "Investigation of a Sodium Hypochlorite Catholyte for an Aluminum Aqueous Battery System," The Journal of Physical Chemistry B, V. 102, No. 49, 1998, pp. 9908-9914.

Fan, L., et al. "The Study of Industrial Aluminum Alloy as Anodes for Aluminum-Air Batteries in Alkaline Electrolytes," Journal of The Electrochemical Society, V. 163, No. 2, 2016, pp. A8-A12.

Zhuk, A. Z., et al. "Use of low-cost aluminum in electric energy production," Journal of Power Sources, V. 157, No. 2, 2006, pp. 921-926.

Epstein, I. R., et al. "Introduction: Self-organization in nonequilibrium chemical systems," Chaos: An Interdisciplinary Journal of Nonlinear Science, V. 16, No. 3, 2006, p. 037101.

Orlik, M. "Introduction to self-organization in chemical and electrochemical systems," Journal of Solid State Electrochemistry, V. 19, No. 11, 2015, pp. 3203-3206.

Pavlidou, M., et al. "Potential oscillations induced by the local breakdown of passive iron in sulfuric acid media. An evaluation of the inhibiting effect of nitrates on iron corrosion," Journal of Solid State Electrochemistry, V. 19, No. 11, 2015, pp. 3207-3217.

Wickramasinghe, M., et al. "Nonlinear Behavior of Nickel Dissolution in Sulfuric Acid in a Cathode-Anode Cell Configuration: Effect of Cathode Area," Journal of The Electrochemical Society, V. 163, No. 14, 2016, pp. H1171-H1178.

Agladze, K., et al. "The initiation of traveling pulses from self-organized oscillations in the iron-nitric acid system," Physical Chemistry Chemical Physics, V. 3, No. 7, 2001, pp. 1326-1330.

Gorzkowski, M. T., et al. "Electrochemical oscillations and bistability during anodic dissolution of vanadium electrode in acidic media—part I. Experiment," Journal of Solid State Electrochemistry, V. 15, Nos. 11-12, 2011, pp. 2311-2320.

Casey, W. H. "Large Aqueous Aluminum Hydroxide Molecules," Chemical Reviews, V. 106, No. 1, 2006, pp. 1-16.

* cited by examiner

PULSED ALUMINUM BATTERY

CROSS-REFERENCES

This application claims the benefit of U.S. Provisional Application No. 62/910,345, filed Oct. 3, 2019.

BACKGROUND OF THE INVENTION

Finding cost efficient, powerful and environmentally friendly independent sources and/or storage of energy is crucial for quickly growing technologies such as mobile computers, drones, medical equipment, solar batteries, electric vehicles and many other devices utilizing autonomous electric power.

Despite of some progress in the field of electrochemical batteries which started in late $19^{th}$ century with first batteries based on heavy metals, such as zinc, lead, cadmium and iron as anodes, the need in searching for better anode materials has drastically increased in last decades.

The last 50 years are characterized by switching from heavy to light metals such as lithium, sodium, magnesium and aluminum, of which lithium became a leading anode material. Development of rechargeable lithium batteries around 1980-1990s has revolutionized the electronics market including mobile telephones, laptop computers, solar power systems and electric vehicles. According to the recent estimates, the rapidly growing market of lithium automobile batteries alone will soon exceed 40 billion dollars. Lithium batteries are known for their high energy density, long shelf life, and capability to withstand many charge-discharge cycles. Nevertheless, lithium is not an optimal anode material, since it is expensive and has limited natural supply.

Recently, new aluminum-based batteries emerged as alternatives to lithium, because aluminum is abundant in nature, has about 70% theoretical gravimetric energy density of lithium and low environmental impact (see, for example, Elia, G. A., et al. "An Overview and Future Perspectives of Aluminum Batteries," *Advanced Materials*, V. 28, No. 35, 2016, pp. 7564-79; Leisegang, T., et al. "The Aluminum-Ion Battery: A Sustainable and Seminal Concept?," *Frontiers in Chemistry*, V. 7, 2019, p. 268; Hu, Y., et al. "Recent Progress and Future Trends of Aluminum Batteries," *Energy Technology*, V. 7, No. 1, 2019, pp. 86-106). Aluminum is a ubiquitous industrial metal produced electrochemically in million tons worldwide (see, for example, Shkolnikov, E. I., et al. "Aluminum as energy carrier: Feasibility analysis and current technologies overview," *Renewable and Sustainable Energy Reviews*, V. 15, No. 9, 2011, pp. 4611-23). It is relatively inexpensive, especially as a technical grade metal (see, for example, Hu, Y., et al. "Recent Progress and Future Trends of Aluminum Batteries," *Energy Technology*, V. 7, No. 1, 2019, pp. 86-106). Of particular interest is recycled aluminum, which is not only widely available from both industrial and retail sources, e.g., disposable household items, but also is ecologically attractive material. In addition, aluminum anodes, unlike lithium, can operate in water-based electrolytes, which is also a big advantage from the environmental perspectives.

Unfortunately, electrochemical power devices with aluminum anodes have still not reached the stage of large scale industrial production, although the concept of aluminum batteries was initially explored more than 150 years ago (see, for example, Buff, H. "Ueber das electrische Verhalten des Aluminiums," *Justus Liebigs Annalen der Chemie*, V. 102, No. 3, 1857, pp. 265-84). It appears that a set of unique technical challenges associated with aluminum as anode material is responsible for this technological underperformance. Unlike lithium, aluminum is a three valence electron metal with rich and sophisticated coordination chemistry, especially in water solutions, which remains poorly understood even today (see, for example, CASEY, W. H. "Large Aqueous Aluminum Hydroxide Molecules," *Chemical Reviews*, V. 106, No. 1, 2006, pp. 1-16). The advances and challenges related to the development of aluminum batteries are summarized in a review paper (see Li, Q., et al. "Aluminum as anode for energy storage and conversion: a review," *Journal of Power Sources*, V. 110, No. 1, 2002, pp. 1-10).

Perhaps the most explored aluminum batteries are metal-air electrochemical systems with aqueous alkaline electrolytes. First systems of this type appeared more than 50 years ago (see, for example, Elia, G. A., et al. "An Overview and Future Perspectives of Aluminum Batteries," *Advanced Materials*, V. 28, No. 35, 2016, pp. 7564-79). Modern alkaline aluminum air batteries employ concentrated KOH or NaOH solutions as electrolytes, and carbon-based electrocatalytic cathodes capable of effectively reducing atmospheric oxygen (see, for example, Ding, F., et al. "Aluminum-Air Batteries: Fundamentals and Applications." In: Neburchilov, V., Zhang, J., eds. Metal-Air and Metal-Sulfur Batteries: Fundamentals and Applications. Boca Raton, CRC Press, 2016, pp. 65-109). In many cases, electrolytes also contain anti-corrosion additives, such as stannates and zincates. According to the recent density functional theory (DFT) calculations, the upper voltage limit of alkaline aluminum-air batteries is about 2.27 V, rather than traditionally assumed 2.74 V, due to intrinsic asymmetry in multi-electron transfers as well as chemical stabilization of transitional aluminum species (see Chen, L. D., et al. "Al-Air Batteries: Fundamental Thermodynamic Limitations from First-Principles Theory," *The Journal of Physical Chemistry Letters*, V. 6, No. 1, 2015, pp. 175-9). The practically achievable alkaline aluminum air cell voltage under moderate load is about 1.6 V, which is far less than this theoretical limit. The most efficient electrocatalytic carbon air cathodes contain precious metal particles, such as platinum, palladium, and their alloys. However, less expensive oxygen reduction catalysts based on cobalt, manganese, iron, copper, and other metal compounds are being actively explored (see, for example, Liu, Y., et al. "A comprehensive review on recent progress in aluminum-air batteries," *Green Energy & Environment*, V. 2, No. 3, 2017, pp. 246-77). The electrochemical reactions of the alkaline aluminum air batteries are presented in Scheme 1.

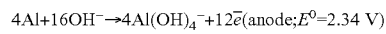

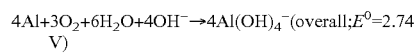

Scheme 1. Electrochemical Reactions of the Alkaline Aluminum Air Batteries.

Another environmentally attractive oxidant for alkaline aluminum batteries is hydrogen peroxide (see, for example, An, L., et al. "The dual role of hydrogen peroxide in fuel cells," *Science Bulletin*, V. 60, No. 1, 2015, pp. 55-64). These aluminum hydrogen peroxide batteries were successfully used for underwater propulsion, and were a subject of several publications (see, for example, Hasvold, Ø., et al. "The alkaline aluminium/hydrogen peroxide power source in the Hugin II unmanned underwater vehicle," *Journal of Power Sources*, V. 80, No. 1, 1999, pp. 254-60; Marsh, C., et al. "A Novel Aqueous Dual-Channel Aluminum-Hydrogen Peroxide Battery," *Journal of The Electrochemical Society*, V. 141, No. 6, 1994, pp. L61-3) and patents. The most efficient systems utilize NaOH or KOH-based electrolytes, and electrocatalytic cathodes made of precious metals, such as Pt/Ir alloys. Less expensive electrocatalytic cathodes can also be used, such as silver-plated brush-type carbon fiber cathodes disclosed in patent U.S. Pat. No. 6,573,008, and woven silver-plated copper wire cathodes disclosed in patent U.S. Pat. No. 8,709,635. The theoretical voltage of alkaline aluminum hydrogen peroxide batteries is about 3.22 V, which is almost 0.5 V higher than the theoretical voltage of alkaline aluminum air batteries. The practically achievable voltage of alkaline aluminum hydrogen peroxide batteries is about 1.8 V under moderate load. The electrochemical reactions of alkaline hydrogen peroxide aluminum batteries are presented in Scheme 2.

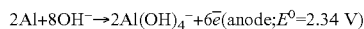
$2Al+8OH^- \rightarrow 2Al(OH)_4^- + 6\overline{e}(anode; E^0=2.34 \text{ V})$

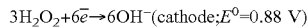
$3H_2O_2+6\overline{e} \rightarrow 6OH^-(cathode; E^0=0.88 \text{ V})$

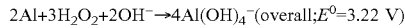
$2Al+3H_2O_2+2OH^- \rightarrow 4Al(OH)_4^-(overall; E^0=3.22 \text{ V})$ Scheme 2. Electrochemical Reactions of the Alkaline Hydrogen Peroxide Aluminum Batteries.

Aluminum batteries employing hypochlorite oxidizers are also known (see, for example, Brenner, A. "Cells with Sodium Hypochlorite or Chlorite and Anodes of Magnesium or Aluminum," *Journal of The Electrochemical Society*, V. 143, No. 10, 1996, pp. 3133-8; Medeiros, M. G., et al. "Investigation of a Sodium Hypochlorite Catholyte for an Aluminum Aqueous Battery System," *The Journal of Physical Chemistry B*, V. 102, No. 49, 1998, pp. 9908-14). These electrochemical power systems are attractive due to high theoretical energy density and high theoretical voltage—above 3.1 volts for an open circuit. In addition, sodium hypochlorite can be easily produced by electrolysis of sea salt solutions, and then converted back to sodium chloride upon usage, which is advantageous from the environmental perspectives. The electrochemical reactions of alkaline hypochlorite aluminum batteries are presented in Scheme 3.

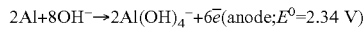
$2Al+8OH^- \rightarrow 2Al(OH)_4^- + 6\overline{e}(anode; E^0=2.34 \text{ V})$

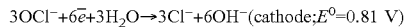
$3OCl^- + 6\overline{e} + 3H_2O \rightarrow 3Cl^- + 6OH^-(cathode; E^0=0.81 \text{ V})$

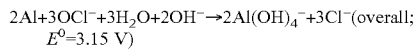
$2Al+3OCl^- + 3H_2O + 2OH^- \rightarrow 2Al(OH)_4^- + 3Cl^-(overall; E^0=3.15 \text{ V})$ Scheme 3. Electrochemical Reactions of the Alkaline Hypochlorite Aluminum Batteries.

Experimental data published in several research papers and patents generally confirmed these expectations, even though experimentally observed characteristics were lower than theoretically predicted. For example, the practically achievable open circuit voltages for alkaline aluminum hypochlorite batteries are typically within the 2.0-2.4 V range (see Brenner, A. "Cells with Sodium Hypochlorite or Chlorite and Anodes of Magnesium or Aluminum," *Journal of The Electrochemical Society*, V. 143, No. 10, 1996, pp. 3133-8; Medeiros, M. G., et al. "Investigation of a Sodium Hypochlorite Catholyte for an Aluminum Aqueous Battery System," *The Journal of Physical Chemistry B*, V. 102, No. 49, 1998, pp. 9908-14).

Several prior patents were issued in relation to aluminum hypochlorite batteries. For example, in U.S. Pat. No. 5,718,986 basic sodium hypochlorite and calcium hypochlorite solutions were explored as oxidants. In addition to sodium hydroxide as a base, some disclosed electrolyte solutions also contain corrosion inhibitors, such as alkali nitrates and carbonates. The patented electrochemical systems employ platinum electrodes as cathodes. This patent is closely related to the above mentioned publication (see Brenner, A. "Cells with Sodium Hypochlorite or Chlorite and Anodes of Magnesium or Aluminum," *Journal of The Electrochemical Society*, V. 143, No. 10, 1996, pp. 3133-8).

Similar electrochemical systems with aluminum anode and copper cathode are presented in earlier U.S. Pat. No. 3,378,408. This patent discloses several electrolytes based on calcium or sodium hypochlorite solutions in pure forms, and with addition of strong bases, such as sodium carbonate and sodium hydroxide. The overall performance of these electrochemical systems is in general agreement with the above mentioned U.S. Pat. No. 5,718,986.

Finally, a recent Japanese Pat. No. 4,883,260, discloses electrochemical systems with household aluminum anodes and various commercial hypochlorite formulations. Copper electrodes serve as preferred cathodes in these systems. Other cathodes, such as graphite-based cathodes, were found to be less efficient. The major distinction of these primary batteries is the use of household aluminum and hypochlorite formulations containing other chemicals. As a result, the performance of these improvised batteries is relatively poor compared to the abovementioned professional aluminum hypochlorite batteries.

As has been mentioned above, a big advantage of aluminum over lithium as anode material in batteries is its usability with aqueous electrolytes. Although aluminum can react with water due to its high negative electrochemical potential, it is naturally protected by thin surface oxide film. Such protection, while preventing aluminum corrosion, impedes electrochemical energy generation. Thus, the challenge for using aluminum as anode material lies in finding conditions in which removing or modifying protective layer would not lead to significant corrosion.

To suppress unwanted corrosion during electrochemical oxidation, anodes of modern alkaline aluminum electrochemical systems are made of either high purity aluminum, or special aluminum alloys with gallium, indium, tin, and other metals (see, for example, Li, Q., et al. "Aluminum as anode for energy storage and conversion: a review," *Journal of Power Sources*, V. 110, No. 1, 2002, pp. 1-10). This significantly reduces economic and environmental benefits of aluminum-based electrochemical energy systems.

There were several attempts to use cheap and widely available industrial aluminum alloys and technical grade aluminum as anodes for alkaline aluminum batteries. For example, U.S. Pat. No. 4,554,131 discloses the use of manganese to alleviate corrosion problems associated with the presence of iron in industrial aluminum alloys. Manganese produces intermetallic Al—Mn—Fe phases, which are less prone for corrosion.

The results of another study indicate that some industrial aluminum alloys are suitable as anodes at high surface current density with Coulomb efficiencies approaching 80%. Unfortunately, at moderate surface current density the efficiency drops below 50% (see Fan, L., et al. "The Study of Industrial Aluminum Alloy as Anodes for Aluminum-Air Batteries in Alkaline Electrolytes," *Journal of The Electrochemical Society*, V. 163, No. 2, 2016, pp. A8-12).

Also, attempts were made to bypass corrosion problems by constructing hybrid aluminum-hydrogen cell electrochemical power systems (see Zhuk, A. Z., et al. "Use of low-cost aluminum in electric energy production," *Journal of Power Sources*, V. 157, No. 2, 2006, pp. 921-6). In these hybrid systems, hydrogen, generated by anode corrosion, is being used for supplemental power generation via a secondary hydrogen fuel cell. Unfortunately, this setup has complicated design negatively affecting economic characteristics of the system.

Because of severe runaway corrosion problems, it is universally assumed that technical grade and recycled aluminum cannot be effectively used as anode in traditional alkaline batteries due to intrinsic corrosion problems. It has been an unexpected discovery of the present inventor that conventional technical grade and recycled aluminum can be effectively used as anode material in a totally new type of aluminum batteries, i.e. pulsed aluminum batteries (PAlBs). In these pulsed batteries, energy is generated only during active states thus preserving the anode from corrosion during inactive states.

SUMMARY OF THE INVENTION

The invention pertains to novel pulsed aluminum batteries (PAlBs). Each PAlB comprising an anode made of aluminum metal; a cathode made of a material capable of electrocatalytic reduction of internal or external oxidants; and a complex water-based electrolyte comprising bases, facilitators, stabilizers, and, optionally, the internal oxidants, wherein the facilitators and stabilizers are capable of supporting stable pulse mode of the PAlBs.

In the preferred embodiments, the aluminum metal of the anode is recycled or technical grade aluminum comprising at least 95% of aluminum; bases are soluble hydroxides of $Li^+$, $Na^+$, $K^+$ or $R^1R^2R^3R^4N^+$; facilitators and stabilizers are specific salts of the same cations; the cathode material comprises electrocatalytic metals such as copper, nickel, and platinum, and internal oxidants are soluble salts with oxidizing anions, such as chlorites, hypochlorites, or hydrogen peroxide. Other variants of PAlBs utilize carbon-based electrocatalytic cathodes capable of reduction of air oxygen as external oxidant, or carbon matrix cathodes containing insoluble internal oxidants, such as $MnO_2$ or $NiO(OH)$.

The invention further pertains to systems comprising a PAlB and an external trigger source capable of controlling PAlBs power output, wherein the external trigger source is electric source or chemical initiator, and wherein controlling the PAlBs power output in pulse frequency modulation mode.

Inventive PAlBs can be used as components of backup power systems, in unmanned aerial vehicles (UAVs), and in autonomous self-powered electrochemical computing systems and sensors.

DETAILED DESCRIPTION OF THE INVENTION

Figure 1:
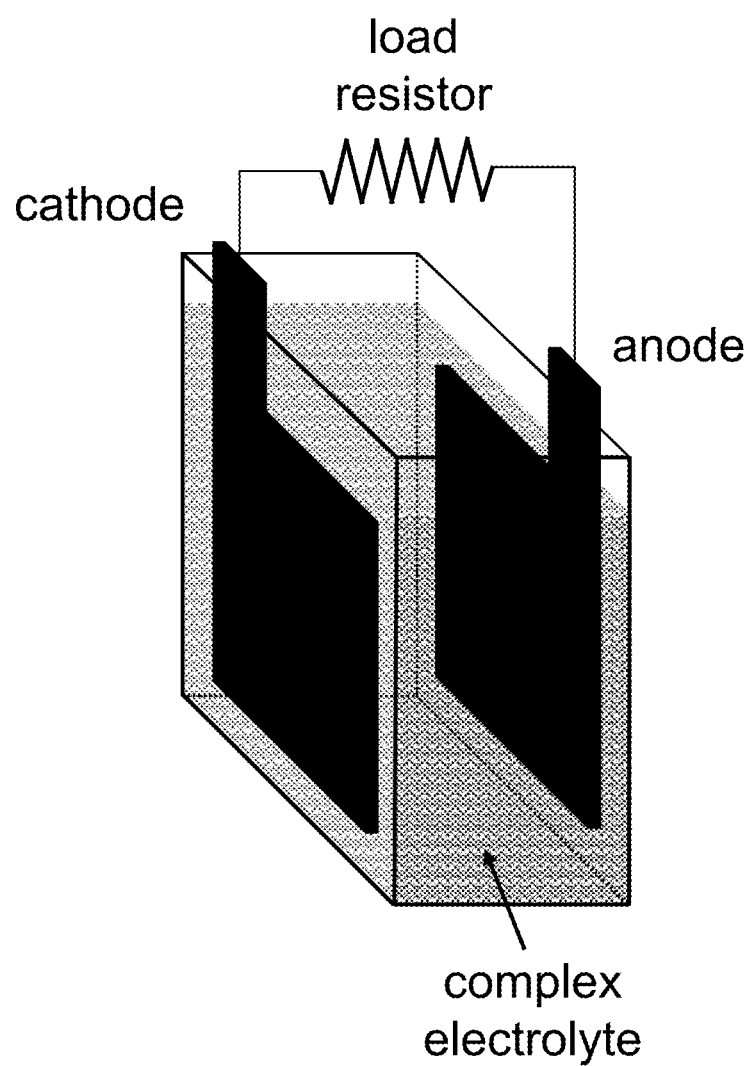
FIG. 1 is a schematic representation of a pulsed aluminum battery (PAlB).

It has been unexpectedly found in the present invention that batteries comprising anode made of aluminum, in particular of technical grade or recycled aluminum, electrocatalytic cathode and a complex water-based electrolyte, can produce periodic electric pulses, thus becoming pulsed aluminum batteries (PAlBs). Moreover, these periodic electric pulses can be regulated by an external stimulus in the pulse-frequency modulation (PFM) mode. The pulse mode of operations prevents runaway corrosion of aluminum anodes and allows attaining high peak power densities required for many challenging technical applications, such as unmanned aerial vehicles (UAVs). Equally important is the discovery that the state of these batteries can be triggered between active and inactive states by external stimuli in a controllable manner. This unique trigger feature expands their utility as component of autonomous self-powered electrochemical computing systems and sensors.

PAlBs have not been previously reported in the literature. Their major mechanism of action is an oscillatory (or periodic) electrochemical reaction in the electrochemical system. Oscillatory electrochemical systems belong to a general class of periodic chemical reactions (see, for example, Epstein, I. R., et al. "Introduction: Self-organization in nonequilibrium chemical systems," *Chaos: An Interdisciplinary Journal of Nonlinear Science*, V. 16, No. 3, 2006, p. 037101). Periodic reactions are examples of chemical transformations in which the rate of formation of intermediate products can be described as a periodic, rather than a monotonous time-dependent function, which results in oscillatory concentration behavior. The overall kinetics of these reactions is exceedingly complex, and usually involves several interconnected autocatalytic processes, where an intermediate product of one reaction serves as a catalyst for another reaction. The whole periodic chemical process is governed by very sophisticated non-equilibrium thermodynamics, and characterized by self-organization, temporal instabilities, negative resistance, oscillations, intrinsic coherence resonance, Turing-like patterns, and eventually chaos (see, for example, Orlik, M. "Introduction to self-organization in chemical and electrochemical systems," *Journal of Solid State Electrochemistry*, V. 19, No. 11, 2015, pp. 3203-6).

Periodic electrochemical systems with non-aluminum anodes are known, but rare. They were first observed more than a century ago, and originally believed to be an engineering artifact related to periodic accumulation of gases or metal oxidation debris. Only in the last 50 years they were recognized as genuine periodic reactions within the framework of non-equilibrium thermodynamics, which provides the basis of scientific explanation of this unusual phenomenon. The commonly explored periodic electrochemical systems, such as iron-sulfuric acid (see, for example, Pavlidou, M., et al. "Potential oscillations induced by the local breakdown of passive iron in sulfuric acid media. An evaluation of the inhibiting effect of nitrates on iron corrosion," *Journal of Solid State Electrochemistry*, V. 19, No. 11, 2015, pp. 3207-17) or nickel-sulfuric acid (see, for example, Wickramasinghe, M., et al. "Nonlinear Behavior of Nickel Dissolution in Sulfuric Acid in a Cathode-Anode Cell Configuration: Effect of Cathode Area," *Journal of The Electrochemical Society*, V. 163, No. 14, 2016, pp. H1171-8), are essentially research tools, and are unsuitable for practical applications. Other known periodic electrochemical systems include iron-nitric acid, which is notable for the formation of traveling wave patterns (see Agladze, K., et al. "The initiation of traveling pulses from self-organized oscillations in the iron-nitric acid system," *Physical Chemistry Chemical Physics*, V. 3, No. 7, 2001, pp. 1326-30), and vanadium-phosphoric acid (see, for example, Gorzkowski, M. T., et al. "Electrochemical oscillations and bistability during anodic dissolution of vanadium electrode in acidic media—part I. Experiment," *Journal of Solid State Electrochemistry*, V. 15, Nos. 11-12, 2011, pp. 2311-20). However, it was not obvious before this work that stable pulsed electrochemical power systems can be constructed using aluminum anodes.

All PAlBs that have been constructed and tested in the present invention, as it has been mentioned above, comprise aluminum anodes, electrocatalytic cathodes, and complex alkaline electrolytes. An important feature of these complex electrolytes for PAlBs is the presence of facilitators and stabilizers, which improve the overall conductivity of the electrolyte and stabilize pulsed mode of action thus being an additional factor for efficient performance of PAlBs. These facilitators and stabilizers are soluble salts capable of modification of non-conductive aluminum hydroxide layer on the aluminum anode leading to improved ion mobility. This modified layer is also capable of sustaining stable pulsed current oscillations. Complex alkaline electrolytes have been the major object of the present research, as they define to a great extent the performance of PAlBs, as will be discussed in details below.

Although the exact mechanism of aluminum anode surface modification leading to pulsed behavior is not fully understood at this time, some empirical correlations emerged from the experimental data. Stable pulsed regime in aluminum batteries is observed only in the presence of soluble facilitators and stabilizes in complex electrolytes. Once the pulsed regime is established, it is possible to continue it in simple traditional alkaline electrolytes without facilitators and stabilizes (such as aqueous solutions of sodium or potassium hydroxide), but for a limited time. Among tested facilitators and stabilizers, soluble chlorides, such as potassium, sodium, and lithium chlorides demonstrated superior performance. Soluble sulfates, such as potassium, sodium, and lithium sulfates can also be used, but the best results were achieved with combination of chlorides and sulfates. A combination of two different cations, such as sodium and lithium, and well as two anions, such as chloride and sulfate, also demonstrated superior performance. The most cost effective facilitators and stabilizers are sodium chloride, sodium sulfate, potassium chloride, potassium sulfate, lithium sulfate and lithium chloride.

In general, acceptable facilitators and stabilizes are soluble salts with alkaline cation, specifically Li, Na and K salts, as well as quaternary ammonium salts, $R^1R^2R^3R^4N^+$, where $R^1$, $R^2$, $R^3$, and $R^4$ are non-ionizable substituents. Anions in these salts are $Cl^-$, $SO_4^{2-}$, $BO_2^-$, $CO_3^{2-}$, $SiO_3^{2-}$, $BF_4^-$, $ClO_4^-$, $CF_3SO_3^-$, and others. In addition, easily oxidizable anions, such as $I^-$, $Br^-$, and organic carboxylates can be used for pulsed aluminum-air alkaline batteries.

The choice of an oxidant significantly affects the performance of PAlBs. The experiments have been performed with a number of known oxidizers, including air oxygen, hydrogen peroxide and hypochlorites. So far, the best results have been obtained with hypochlorites. Both sodium hypochlorite and potassium hypochlorite can be successfully employed, but inexpensive and easily available sodium hypochlorite is a preferred oxidant. Lithium hypochlorite can also be used, but it is relatively expensive. Calcium hypochlorite gives unsatisfactory results due to the precipitation of calcium hydroxide in alkaline electrolytes.

Other acceptable oxidants for PAlBs include, but not limited to, soluble salts with certain oxidizing anions, such as nitrate ($NO_3^-$), chlorite ($ClO_2^-$), chlorate ($ClO_3^-$), bromate ($BrO_3^-$), iodate ($IO_3^-$), periodate ($IO_4^-$), triiodide ($I_3^-$), tribromide ($Br_3^-$), and polysulfides ($S_n^{2-}$, n=3-5). The list of acceptable oxidants also includes soluble salt with peroxide anions, such as peroxide ($O_2^{2-}$), hydroperoxide ($HO_2^-$), perborate ($B_2O_6^{2-}$) and persulfate ($S_2O_8^{2-}$). Cations in these oxidizers could be Li, Na, K, and quaternary ammonium salts, $R^1R^2R^3R^4N^+$, where $R^1$, $R^2$, $R^3$, and $R^4$ are non-ionizable substituents. Free halogens, such as $Cl_2$, $Br_2$ and $I_2$, mixed halogens, such as ICl, and halogen oxides, such as $Cl_2O$ and $ClO_2$, can be used as neutral oxidizers. The list of acceptable oxidants also includes known insoluble cathode materials, particularly $MnO_2$ and $NiO(OH)$, as well as $CuO$, $Fe_2O_3$ and $Fe_3O_4$. These insoluble oxidants require conductive carbon matrix for adequate performance in lieu of an electrocatalytic metal cathode.

More details regarding the influence of other facilitators and stabilizers emerged from the experiments with the most promising pulsed aluminum hypochlorite batteries. The results of these experiments demonstrated uniqueness of these systems compared to the known non-pulsing batteries disclosed in U.S. Pat. Nos. 3,378,408 and 5,718,986. Thus, traditional corrosion inhibitors either do not materially affect the performance of these pulsed batteries (zincates), or have adverse effect (stannates). The addition of carbonates does not improve the performance, whereas the presence of phosphates in moderate amounts negatively affects the pulsed regime. Some positive results were obtained with soluble silicates, but their utility is limited due to a strong inhibitory effect on electrocatalytic cathodes.

Preferred facilitators and stabilizers for these pulsed aluminum hypochlorite batteries include, but not limited to, sodium chloride with small additions of soluble lithium and potassium salts, and sodium sulfate. These salt combinations include mixtures of NaCl with LiCl, $Li_2SO_4$, KCl, $K_2SO_4$, and $Na_2SO_4$. Atomic ratio of sodium to lithium and potassium in these mixtures should be between 100:1 to 1:1, preferably 10:1. Concentration of sodium chloride should be between 0.1 M and 3 M, preferably 1.5 M. Concentration of additional potassium and lithium salts should be between 0.01 M and 0.5 M, preferably 0.15 M. For optimal performance of these preferred facilitators and stabilizers, concentration of hypochlorite should be between 0.5 M and 1.5 M, preferably 1.0 M, and concentration of hydroxide should be between 0.5 M and 2.0 M, preferably 1.0 M.

The influence of alkaline base agents was also explored. Both sodium hydroxide and potassium hydroxide are equally effective. Sodium hydroxide is preferred due to cost considerations. The concentration of alkaline agent affects the performance. Generally, higher concentrations lead to longer active state pulses, but allow operations at lower temperatures. The best results were achieved using 0.5-2 M concentrations of sodium hydroxide at room temperature, preferably 1 M. Quaternary ammonium hydroxides, $R^1R^2R^3R^4N^+OH^-$, where $R^1$, $R^2$, $R^3$, and $R^4$ are non-ionizable substituents, provide similar results, but these hydroxides are more expensive. Lithium hydroxide can also be used, but relatively low solubility and noticeable effect on pulsing regime limits its applicability.

The choice of electrocatalytic cathode affects the performance and pulsing stability of PAlBs. Specifically, economically attractive electrocatalytic silver-coated cathodes perform poorly, which seriously impede operations of valuable aluminum-air and aluminum-hydrogen peroxide pulsed batteries. The same negative effect of silver cathode was observed in aluminum-hypochlorite systems, but, fortunately, other cost-effective electrocatalytic cathodes, such as nickel, copper and copper-nickel alloy cathodes, can be successfully used in these systems. Palladium-coated (see Medeiros, M. G., et al. "Investigation of a Sodium Hypochlorite Catholyte for an Aluminum Aqueous Battery System," *The Journal of Physical Chemistry B*, V. 102, No. 49, 1998, pp. 9908-14) and platinum-coated (this work) cathodes can also be employed in pulsed aluminum-hypochlorite systems, but the high cost of these cathodes is prohibitive for practical applications. Several attempts were made to use industrial carbon-$MnO_x$ ($1 \leq x \leq 2$) electrocatalytic cathodes for pulsed aluminum-air batteries, but inherent supercapacitor behavior of these cathodes complicates pulsing control. Other acceptable electrocatalytic cathodes for PAlBs include, but not limited to, platinum-iridium, rhodium, platinum-rhodium, and platinum-nickel metal cathodes, as well as non-precious metal oxide cathodes, including $CoO_x$, $FeO_x$, $LaNiO_x$, $LaMnO_x$, $NiFeO_x$, $NiCoO_x$ ($1 \leq x \leq 4$) in carbon matrix, and others. Electrochemically inert cathode materials, such as graphite, yield marginal results even with the most potent oxidants, such as hypochlorites.

In many preferred embodiments, electrocatalytic cathode is a copper electrode, which is only partially passivated in the complex alkaline hypochlorite electrolyte. This partial passivation does not impede the long-term operations of the battery. Nickel and nickel-copper alloys provide better durability as electrocatalytic cathodes, but they are less effective. The mechanism of electrocatalytic reduction of hypochlorite anions on nickel and copper electrodes is not thoroughly investigated. It might be speculated that such reduction is related to known catalytic decomposition of hypochlorites in the presence of certain copper and nickel salts (see, for example, Lister, M. W. "Decomposition of Sodium Hypochlorite: The Catalyzed Reaction," *Canadian Journal of Chemistry*, V. 34, No. 4, 1956, pp. 479-88).

The composition of aluminum anode has moderate influence on the performance of PAlBs, as long as aluminum content is above 95%. This allows effective utilization of recycled metal, which always contain various minor components, most frequently iron, silicon, magnesium, manganese, copper, zinc, titan, chromium, and others. The presence of manganese generally improves the pulsing stability of the batteries. At the same time, high purity aluminum anodes (>99.9% Al) performs poorly.

Temperature is also an important factor affecting the performance of PAlBs. As expected, temperature increase results in increasing pulse frequency. At temperatures above 70° C. PAlBs usually undergo regime change to a permanently active state, which results in runaway corrosion of the anode. Lowering the temperature below 0° C. decreases pulse frequency to the extent where pulse-triggering control becomes problematic. The best performance was achieved at room temperatures, 18-23° C.

Triggering mechanism, which allows controlling the performance of PAlBs, is important. The easiest way to control PAlBs is application of short external electric pulses. The best results were achieved by applying 90% (relative to the maximum cell voltage) electric pulses with ⅕ duration of the resulting active state of the battery. Shorter external trigger pulses and/or those with lower amplitude produce less reliable results, while longer external trigger pulses and/or those with higher amplitude reduce energy efficiency of the control system. PAlBs can also be triggered into active state by injection of a small amount of a proper catalyst, such as $KMnO_4$, $NaIO_4$, or $K_2FeO_4$. However, chemical triggering is more complicated, and cannot be performed infinitely due to accumulation of undesirable by-products in the complex electrolyte.

In the preferred embodiments (see examples 1-6), PAlBs feature recycled aluminum anodes with at least 95% aluminum content; copper, nickel, or platinum electrocatalytic cathodes, or industrial $MnO_2$-carbon and activated carbon-air cathodes; and complex alkaline electrolytes containing sodium hypochlorite as an oxidizer, sodium chloride with small amounts of sodium sulfate, potassium sulfate, lithium chloride or lithium sulfate as stabilizers and facilitators, and sodium hydroxide as a base. The optimal concentrations of sodium hydroxide are in the range of 1.0-1.5 M; sodium chloride 1.0-2.0 M; sodium hypochlorite 0.5-1.5 M; and lithium and potassium salts 0.1-0.3 M. The optimal temperatures are in the range of 19-22° C.

EXAMPLE 1

Figure 3:
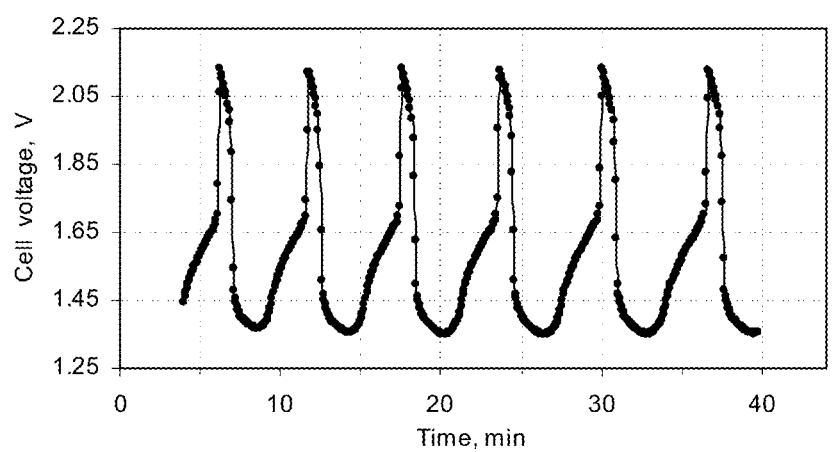
FIG. 3 represents output voltage pulses produced by a PAlB comprising an aluminum anode, a copper cathode, a complex electrolyte, and 100Ω load resistor at 20° C.

The electrochemical cell of the pulsed aluminum battery (FIG. 1), equipped with a 7×7 cm square recycled aluminum anode (0.2 mm thickness) and a 15×15 cm square copper cathode (0.3 mm thickness), was filled with a complex electrolyte prepared from 150 mL of commercial sodium hypochlorite solution (8.2% of sodium hypochlorite and 8.9% of sodium chloride by weight), 6.0 g sodium hydroxide, and 1.2 g of lithium chloride. The electrodes were fully immersed in the electrolyte, and the air-exposed conductor parts of the electrodes were covered by a protective adhesive tape. The electrodes in the electrochemical cell were electrically connected to a 100Ω load resistor. The voltage on this resistor was monitored by a digital voltmeter. The temperature of the electrolyte was measured by a thermocouple thermometer. The following output voltage pulses were produced at 20° C. (FIG. 3).

EXAMPLE 2

Figure 2:
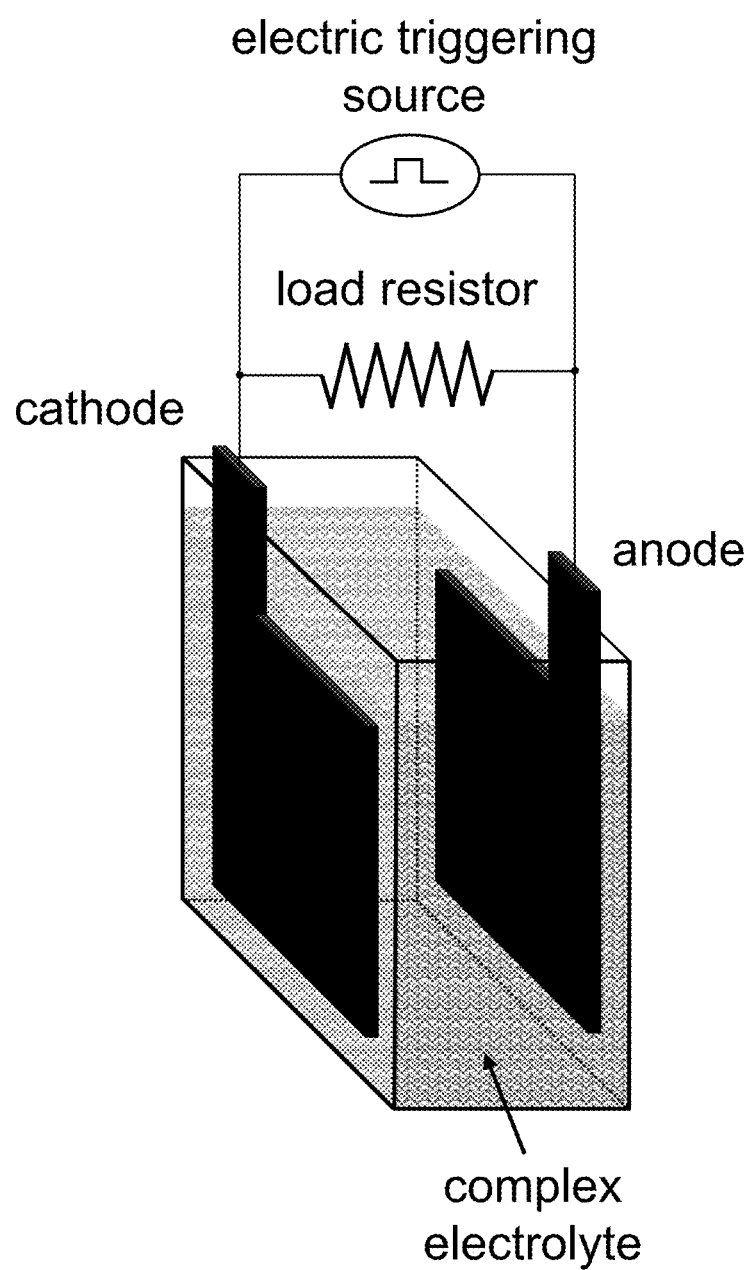
FIG. 2 is a schematic representation of a pulsed aluminum battery (PAlB) system with an external electric source providing an electric signal for triggering controllable pulses.
Figure 4:
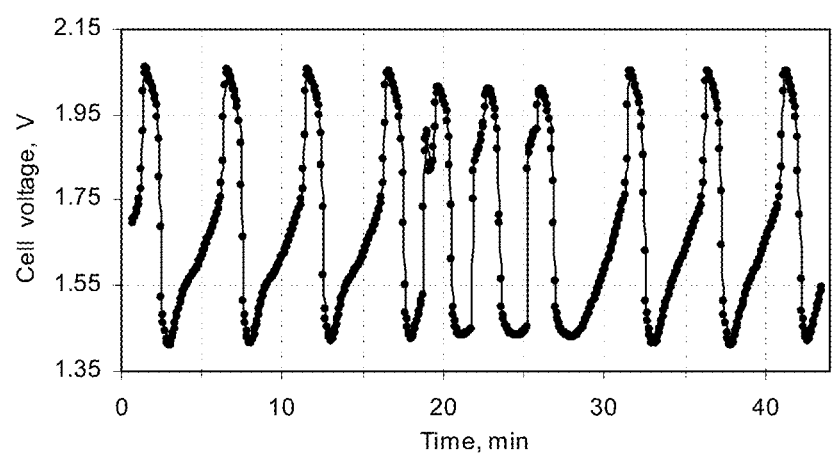
FIG. 4 represents a combination of natural and triggered output voltage pulses produced by a regulated PAlB system comprising an aluminum anode, a copper cathode, a complex electrolyte, and 2000Ω load resistor at 22° C.

The electrochemical system of the regulated pulsed aluminum battery (FIG. 2), equipped with a 5×5 cm square recycled aluminum anode (0.2 mm thickness) and a 7×7 cm square copper-cathode (0.3 mm thickness), was filled with a complex electrolyte prepared from 150 mL of commercial sodium hypochlorite solution (8.2% of sodium hypochlorite and 8.9% of sodium chloride by weight), 6.0 g sodium hydroxide, and 1.2 g of lithium chloride. The electrodes were fully immersed in the electrolyte, and the air-exposed conductor parts of the electrodes were covered by a protective adhesive tape. The electrodes in the electrochemical system were electrically connected to a 2000Ω load resistor. The voltage on this resistor was monitored by a digital voltmeter. The temperature of the electrolyte was measured by a thermocouple thermometer. The following output voltage pulses were produced at 22° C. (FIG. 4). The three middle voltage peaks were triggered by applying short (10 sec) external electric pulses (1.85 V).

EXAMPLE 3

Figure 5:
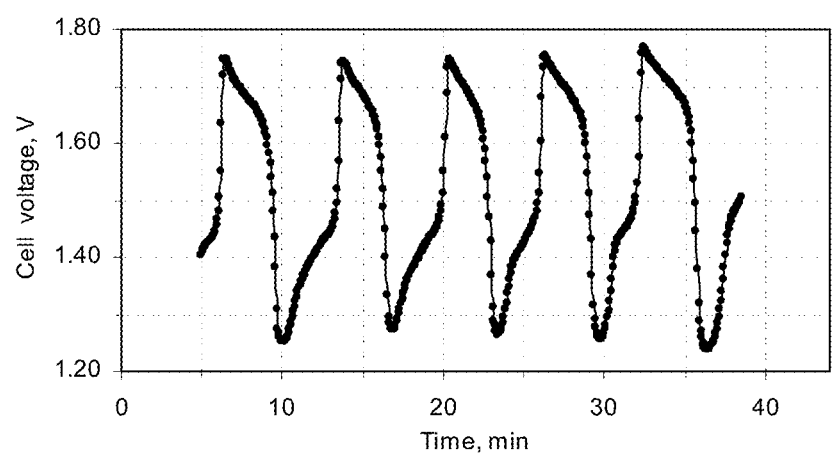
FIG. 5 represents output voltage pulses produced by a PAlB comprising an aluminum anode, a nickel cathode, a complex electrolyte, and 100Ω load resistor at 19° C.

The same as example 1, but the a 15×15 cm square copper cathode was replaced with a 10×10 cm square nickel (99.8%) cathode, and the quantity of NaOH was increased to 8.0 g. The following output voltage pulses were produced at 19° C. (FIG. 5).

EXAMPLE 4

Figure 6:
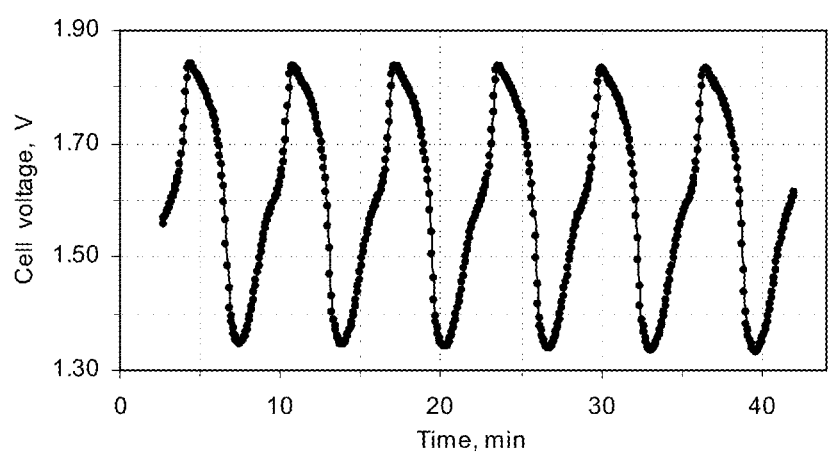
FIG. 6 represents output voltage pulses produced by a PAlB comprising an aluminum anode, a platinum cathode, a complex electrolyte, and 3300Ω load resistor at 20° C.

The same as in example 1, but the a 15×15 cm square copper cathode was replaced with a 5×5 cm square platinum cathode (0.03 mm thickness), a 7×7 cm square recycled aluminum anode was replaced with a 2×2 cm square technical grade aluminum anode, the 100Ω load resistor was replaced with a 3300Ω load resistor, and 0.8 g of $Li_2SO_4$ was used instead of 1.2 g of LiCl. The following output voltage pulses were produced at 20° C. (FIG. 6).

EXAMPLE 5

Figure 7:
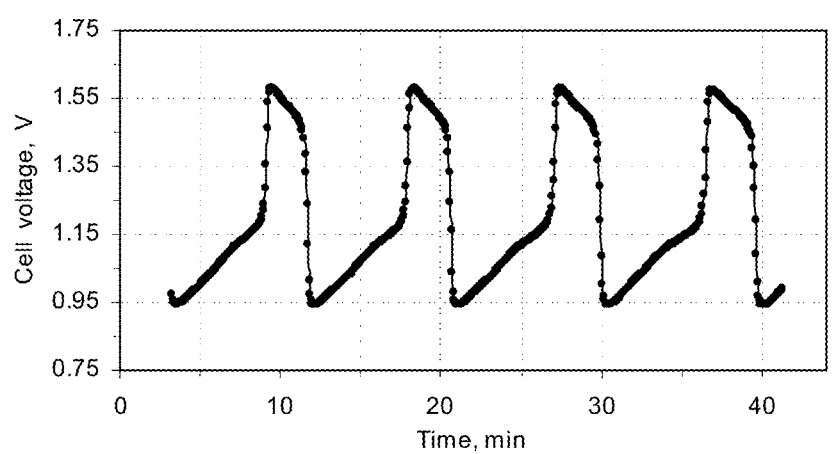
FIG. 7 represents output voltage pulses produced by a PAlB comprising an aluminum anode, an industrial $MnO_2$-carbon cathode, a complex electrolyte, and 1000Ω load resistor at 22° C.

The same as in example 1, but the a 15×15 cm square copper cathode was replaced with a 5×5 cm industrial $MnO_2$-carbon cathode (4 mm thickness), a 7×7 cm square recycled aluminum anode was replaced with a 2×3 cm rectangular recycled aluminum anode, the 100Ω load resistor was replaced with a 1000Ω load resistor, and 2.6 g of anhydrous $Na_2SO_4$ was added to a complex electrolyte. The following output voltage pulses were produced at 22° C. (FIG. 7).

EXAMPLE 6

Figure 8:
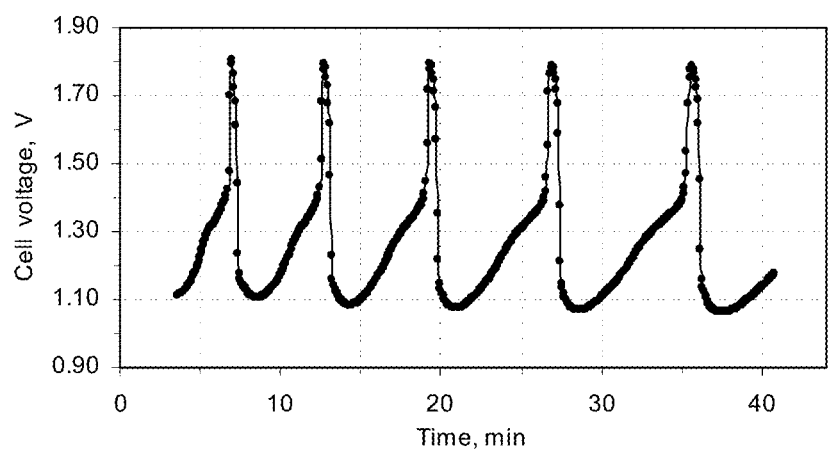
FIG. 8 represents output voltage pulses produced by a PAlB comprising an aluminum anode, an industrial activated carbon-air cathode, a complex electrolyte, and 1000Ω load resistor at 21° C.

The same as in example 1, but the a 15×15 cm square copper cathode was replaced with a 5×10 cm rectangular industrial activated carbon-air cathode (1 mm thickness, non-electrolyte side was made air-accessible), a 7×7 cm square recycled aluminum anode was replaced with a 2×3 cm rectangular recycled aluminum anode, the 100Ω load resistor was replaced with a 1000Ω load resistor, and 3.0 g of anhydrous $K_2SO_4$ was added to a complex electrolyte. The following output voltage pulses were produced at 21° C. (FIG. 8).

Thus, the inventive PAlBs can be classified in seven main groups.

In the first group PAlBs comprise:
i) an anode comprising aluminum metal, wherein in the preferred embodiment the aluminum metal is recycled or technical grade aluminum comprising at least 95% of aluminum;
ii) a cathode comprising a material capable of electrocatalytic reduction of internal oxidants, wherein in the preferred embodiments the cathode comprises electrocatalytic metals selected from the group consisting of copper, nickel, platinum, palladium, iridium, rhodium, and alloys thereof;
iii) a complex water-based electrolyte comprising bases, facilitators, stabilizers, and the internal oxidants, wherein the facilitators and stabilizers are capable of supporting stable pulse mode of the PAlB, and wherein in the preferred embodiments:
the bases are soluble hydroxides comprising cations selected from the group consisting of $Li^+$, $Na^+$, $K^+$ and quaternary ammonium salts, $R^1R^2R^3R^4N^+$, where $R^1$, $R^2$, $R^3$, and $R^4$ are non-ionizable substituents;
the facilitators and stabilizers are soluble salts comprising:
anions selected from the group consisting of chloride ($Cl^-$), sulfate ($SO_4^{2-}$), tetrafluoroborate ($BF_4^-$), perchlorate ($ClO_4^-$), trifluoromethanesulfonate ($CF_3SO_3^-$), metaborate ($BO_2^-$), silicate, ($SiO_3^{2-}$), carbonate ($CO_3^{2-}$), and mixtures thereof, and
cations selected from the group consisting of $Li^+$, $Na^+$, $K^+$ and quaternary ammonium salts, $R^1R^2R^3R^4N^+$, where $R^1$, $R^2$, $R^3$, and $R^4$ are non-ionizable substituents, and mixtures thereof; and
the internal oxidants are selected from:
soluble salts comprising:
oxidizing anions selected from the group consisting of nitrate ($NO_3^-$), hypochlorite ($ClO^-$), chlorite ($ClO_2^-$), chlorate ($ClO_3^-$), bromate ($BrO_3^-$), iodate ($IO_3^-$), peroxide ($O_2^{2-}$), hydroperoxide ($HOO^-$), perborate ($B_2O_6^{2-}$), persulfate ($S_2O_8^{2-}$), and polysulfides ($S_n^{2-}$, n=3-5), and
cations selected from the group consisting of $Li^+$, $Na^+$, $K^+$ and quaternary ammonium salts, $R^1R^2R^3R^4N^+$, where $R^1$, $R^2$, $R^3$, and $R^4$ are non-ionizable substituents, and mixtures thereof; or
hydrogen peroxide.

In the second group PAlBs comprise:
i) an anode comprising aluminum metal, wherein in the preferred embodiment the aluminum metal is recycled or technical grade aluminum comprising at least 95% of aluminum;
ii) a cathode comprising a carbon mixed with insoluble internal oxidants, wherein in the preferred embodiment the insoluble internal oxidants are selected from the group consisting of $MnO_2$, $NiO(OH)$, $CuO$, $Fe_2O_3$, $Fe_3O_4$, and mixtures thereof;
iii) a complex water-based electrolyte comprising bases, facilitators, stabilizers, and the internal oxidants, wherein the facilitators and stabilizers are capable of supporting stable pulse mode of the PAlB, and wherein in the preferred embodiments:
the bases are soluble hydroxides comprising cations selected from the group consisting of $Li^+$, $Na^+$, $K^+$ and quaternary ammonium salts, $R^1R^2R^3R^4N^+$, where $R^1$, $R^2$, $R^3$, and $R^4$ are non-ionizable substituents;
the facilitators and stabilizers are soluble salts comprising:
anions selected from the group consisting of chloride ($Cl^-$), hypochlorite ($ClO^-$), sulfate ($SO_4^{2-}$), tetrafluoroborate ($BF_4^-$), perchlorate ($ClO_4^-$), trifluoromethanesulfonate ($CF_3SO_3^-$), metaborate ($BO_2^-$), silicate, ($SiO_3^{2-}$), carbonate ($CO_3^{2-}$), and mixtures thereof, and
cations selected from the group consisting of $Li^+$, $Na^+$, $K^+$ and quaternary ammonium salts, $R^1R^2R^3R^4N^+$, where $R^1$, $R^2$, $R^3$, and $R^4$ are non-ionizable substituents, and mixtures thereof.

PAlBs of the third group comprise:
i) an anode comprising aluminum metal, wherein in the preferred embodiment the aluminum metal is recycled or technical grade aluminum comprising at least 95% of aluminum;
ii) a cathode comprising a material capable of electrocatalytic reduction of oxygen as external oxidant, wherein the cathode performance depends on an oxygen source, and wherein in the preferred embodiments the cathode material is carbon mixed with electrocatalytic metal oxides selected from the group consisting of $MnO_x$, $CoO_x$, $FeO_x$, $LaNiO_x$, $LaMnO_x$, $NiFeO_x$, $NiCoO_x$ ($1 \leq x \leq 4$) and mixtures thereof, and the oxygen source is air oxygen;

iii) a complex water-based electrolyte comprising bases, facilitators, stabilizers, and the internal oxidants, wherein the facilitators and stabilizers are capable of supporting stable pulse mode of the PAlB, and wherein in the preferred embodiments:

the bases are soluble hydroxides comprising cations selected from the group consisting of $Li^+$, $Na^+$, $K^+$ and quaternary ammonium salts, $R^1R^2R^3R^4N^+$, where $R^1$, $R^2$, $R^3$, and $R^4$ are non-ionizable substituents;

the facilitators and stabilizers are soluble salts comprising:

anions selected from the group consisting of chloride ($Cl^-$), bromide ($Br^-$), iodide ($I^-$), sulfate ($SO_4^{2-}$), tetrafluoroborate ($BF_4^-$), perchlorate ($ClO_4^-$), trifluoromethanesulfonate ($CF_3SO_3^-$), metaborate ($BO_2^-$), silicate, ($SiO_3^{2-}$), carbonate ($CO_3^{2-}$), organic carboxylates, and mixtures thereof, and cations selected from the group consisting of $Li^+$, $Na^+$, $K^+$ and quaternary ammonium salts, $R^1R^2R^3R^4N^+$, where $R^1$, $R^2$, $R^3$, and $R^4$ are non-ionizable substituents, and mixtures thereof.

PAlB systems of the fourth group comprises:

a) an external electric source providing an electric signal for triggering controllable pulses, wherein in the preferred embodiment the external electric signal controls the power output of the PAlB in pulse frequency modulation mode;

b) a PAlB, comprising, i) an anode comprising aluminum metal, wherein in the preferred embodiment the aluminum metal is recycled or technical grade aluminum comprising at least 95% of aluminum;

ii) a cathode comprising a material capable of electrocatalytic reduction of internal oxidants, wherein in the preferred embodiments the cathode comprises electrocatalytic metals selected from the group consisting of copper, nickel, platinum, palladium, iridium, rhodium, and alloys thereof;

iii) a complex water-based electrolyte comprising bases, facilitators, stabilizers, and the internal oxidants, wherein the facilitators and stabilizers are capable of supporting stable pulse mode of the PAlB, and wherein in the preferred embodiments:

the bases are soluble hydroxides comprising cations selected from the group consisting of $Li^+$, $Na^+$, $K^+$ and quaternary ammonium salts, $R^1R^2R^3R^4N^+$, where $R^1$, $R^2$, $R^3$, and $R^4$ are non-ionizable substituents;

the facilitators and stabilizers are soluble salts comprising:

anions selected from the group consisting of chloride ($Cl^-$), sulfate ($SO_4^{2-}$), tetrafluoroborate ($BF_4^-$), perchlorate ($ClO_4^-$), trifluoromethanesulfonate ($CF_3SO_3^-$), metaborate ($BO_2^-$), silicate, ($SiO_3^{2-}$), carbonate ($CO_3^{2-}$), and mixtures thereof, and cations selected from the group consisting of $Li^+$, $Na^+$, $K^+$ and quaternary ammonium salts, $R^1R^2R^3R^4N^+$, where $R^1$, $R^2$, $R^3$, and $R^4$ are non-ionizable substituents, and mixtures thereof;

the internal oxidants are selected from the group of:

soluble salts comprising:

oxidizing anions selected from the group consisting of hypochlorite ($ClO^-$), chlorite ($ClO_2^-$), chlorate ($ClO_3^-$), bromate ($BrO_3^-$), iodate ($IO_3^-$), peroxide ($O_2^{2-}$), hydroperoxide ($HOO^-$), perborate ($B_2O_6^{2-}$); and cations selected from the group consisting of $Li^+$, $Na^+$, $K^+$ and quaternary ammonium salts, $R^1R^2R^3R^4N^+$, where $R^1$, $R^2$, $R^3$, and $R^4$ are non-ionizable substituents, and mixtures thereof, or hydrogen peroxide;

wherein the PAlB system has controlled power output of the PAlB.

PAlB systems of the fifth group comprises:

a) an external electric source providing an electric signal for triggering controllable pulses, wherein in the preferred embodiment the external electric signal controls the power output of the PAlB in pulse frequency modulation mode;

b) a PAlB, comprising, i) an anode comprising aluminum metal, wherein in the preferred embodiment the aluminum metal is recycled or technical grade aluminum comprising at least 95% of aluminum;

ii) a cathode comprising a carbon mixed with insoluble internal oxidants, wherein in the preferred embodiment the insoluble internal oxidants are selected from the group consisting of $MnO_2$, $NiO(OH)$, $CuO$, $Fe_2O_3$, $Fe_3O_4$, and mixtures thereof;

iii) a complex water-based electrolyte comprising bases, facilitators, stabilizers, and the internal oxidants, wherein the facilitators and stabilizers are capable of supporting stable pulse mode of the PAlB, and wherein in the preferred embodiments:

the bases are soluble hydroxides comprising cations selected from the group consisting of $Li^+$, $Na^+$, $K^+$ and quaternary ammonium salts, $R^1R^2R^3R^4N^+$, where $R^1$, $R^2$, $R^3$, and $R^4$ are non-ionizable substituents;

the facilitators and stabilizers are soluble salts comprising:

anions selected from the group consisting of chloride ($Cl^-$), hypochlorite ($ClO^-$), sulfate ($SO_4^{2-}$), tetrafluoroborate ($BF_4^-$), perchlorate ($ClO_4^-$), trifluoromethanesulfonate ($CF_3SO_3^-$), metaborate ($BO_2^-$), silicate, ($SiO_3^{2-}$), carbonate ($CO_3^{2-}$), and mixtures thereof, and cations selected from the group consisting of $Li^+$, $Na^+$, $K^+$ and quaternary ammonium salts, $R^1R^2R^3R^4N^+$, where $R^1$, $R^2$, $R^3$, and $R^4$ are non-ionizable substituents, and mixtures thereof;

wherein the PAlB system has controlled power output of the PAlB.

PAlB systems of the sixth group comprises:

a) an external electric source providing an electric signal for triggering controllable pulses, wherein in the preferred embodiment the external electric signal controls the power output of the PAlB in pulse frequency modulation mode;

b) a PAlB, comprising, i) an anode comprising aluminum metal, wherein in the preferred embodiment the aluminum metal is recycled or technical grade aluminum comprising at least 95% of aluminum;

ii) a cathode comprising a material capable of electrocatalytic reduction of external oxidants, wherein in the preferred embodiments the cathode material is carbon mixed with electrocatalytic metal oxides selected from the group consisting of $MnO_x$, $CoO_x$, $FeO_x$, $LaNiO_x$, $LaMnO_x$, $NiFeO_x$, $NiCoO_x$ ($1 \leq x \leq 4$), and mixtures thereof, and external oxidant is air oxygen;

iii) a complex water-based electrolyte comprising bases, facilitators, stabilizers, and the internal oxidants, wherein the facilitators and stabilizers are capable of supporting stable pulse mode of the PAlB, and wherein in the preferred embodiments:

the bases are soluble hydroxides comprising cations selected from the group consisting of $Li^+$, $Na^+$, $K^+$ and quaternary ammonium salts, $R^1R^2R^3R^4N^+$, where $R^1$, $R^2$, $R^3$, and $R^4$ are non-ionizable substituents;

the facilitators and stabilizers are soluble salts comprising:
anions selected from the group consisting of chloride ($Cl^-$), bromide ($Br^-$), iodide ($I^-$), sulfate ($SO_4^{2-}$), tetrafluoroborate ($BF_4^-$), perchlorate ($ClO_4^-$), trifluoromethanesulfonate ($CF_3SO_3^-$), metaborate ($BO_2^-$), silicate, ($SiO_3^{2-}$), carbonate ($CO_3^{2-}$), organic carboxylates, and mixtures thereof; and
cations selected from the group consisting of $Li^+$, $Na^+$, $K^+$ and quaternary ammonium salts, $R^1R^2R^3R^4N^+$, where $R^1$, $R^2$, $R^3$, and $R^4$ are non-ionizable substituents, and mixtures thereof;

wherein the PAlB system has controlled power output of the PAlB.

PAlB systems of the seventh group comprises:
a) an external chemical initiator comprising a triggering catalyst capable of triggering controllable pulses, wherein in the preferred embodiments the triggering catalyst is a soluble salt comprising:
a strongly oxidizing anion selected from the group consisting of permanganate ($MnO_4^-$), periodate ($IO_4^-$), ferrate ($FeO_4^{2-}$), and mixtures thereof;
and a cation selected from the group consisting of $Li^+$, $Na^+$, $K^+$ and quaternary ammonium salts, $R^1R^2R^3R^4N^+$, where $R^1$, $R^2$, $R^3$, and $R^4$ are non-ionizable substituents, and mixtures thereof;
and wherein the triggering catalyst controls the power output of the PAlB in pulse frequency modulation mode;
b) a PAlB, comprising,
i) an anode comprising aluminum metal, wherein in the preferred embodiment the aluminum metal is recycled or technical grade aluminum comprising at least 95% aluminum.
ii) a cathode comprising a material capable of electrocatalytic reduction of internal oxidants, wherein in the preferred embodiments the cathode comprises electrocatalytic metals selected from the group consisting of copper, nickel, platinum, palladium, iridium, rhodium, and alloys thereof;
iii) a complex water-based electrolyte comprising bases, facilitators, stabilizers, and internal oxidants, wherein the facilitators and stabilizers are capable of supporting stable pulse mode and allow controlling triggered pulses, and wherein in the preferred embodiments:
the bases are soluble hydroxides comprising cations selected from the group consisting of $Li^+$, $Na^+$, $K^+$ and quaternary ammonium salts, $R^1R^2R^3R^4N^+$, where $R^1$, $R^2$, $R^3$, and $R^4$ are non-ionizable substituents;
the facilitators and stabilizers are soluble salts comprising:
anions selected from the group consisting of chloride ($Cl^-$), sulfate ($SO_4^{2-}$), tetrafluoroborate ($BF_4^-$), perchlorate ($ClO_4^-$), trifluoromethanesulfonate ($CF_3SO_3^-$), metaborate ($BO_2^-$), silicate, ($SiO_3^{2-}$), carbonate ($CO_3^{2-}$), and mixtures thereof, and
cations selected from the group consisting of $Li^+$, $Na^+$, $K^+$ and quaternary ammonium salts, $R^1R^2R^3R^4N^+$, where $R^1$, $R^2$, $R^3$, and $R^4$ are non-ionizable substituents, and mixtures thereof; and the internal oxidants are selected from:
soluble salts comprising:
oxidizing anions selected from the group consisting of hypochlorite ($ClO^-$), chlorite ($ClO_2^-$), chlorate ($ClO_3^-$), bromate ($BrO_3^-$), iodate ($IO_3^-$), and
cations selected from the group consisting of $Li^+$, $Na^+$, $K^+$ and quaternary ammonium salts, $R^1R^2R^3R^4N^+$, where $R^1$, $R^2$, $R^3$, and $R^4$ are non-ionizable substituents, and mixtures thereof;

wherein the PAlB system has controlled power output of the PAlB.

The invention claimed is:

1. A pulsed aluminum battery (PAlB) comprising:
i) an anode comprising aluminum metal, wherein the aluminum metal is selected from recycled or technical grade aluminum comprising at least 95% of aluminum;
ii) a complex water-based electrolyte comprising bases, facilitators, stabilizers, and optionally internal oxidants, wherein the facilitators and stabilizers are capable of supporting stable pulse mode of the PAlB;
iii) a cathode.

2. The PAlB of claim 1, wherein the bases are soluble hydroxides comprising cations selected from the group consisting of $Li^+$, $Na^+$, $K^+$ and quaternary ammonium salts, $R^1R^2R^3R^4N^+$, where $R^1$, $R^2$, $R^3$, and $R^4$ are non-ionizable substituents.

3. The PAlB of claim 1, wherein the facilitators and stabilizers are soluble salts comprising anions selected from the group consisting of chloride ($Cl^-$), hypochlorite ($ClO^-$), sulfate ($SO_4^{2-}$), tetrafluoroborate ($BF_4^-$), perchlorate ($ClO_4^-$), trifluoromethanesulfonate ($CF_3SO_3^-$), metaborate ($BO_2^-$), silicate, ($SiO_3^{2-}$), carbonate ($CO_3^{2-}$), and mixtures thereof, and cations selected from the group consisting of $Li^+$, $Na^+$, $K^+$ and quaternary ammonium salts, $R^1R^2R^3R^4N^+$, where $R^1$, $R^2$, $R^3$, and $R^4$ are non-ionizable substituents, and mixtures thereof.

4. The PAlB of claim 1, wherein the cathode is air cathode comprising carbon mixed with electrocatalytic metal oxides selected from the group consisting of $MnO_x$, $CoO_x$, $FeO_x$, $LaNiO_x$, $LaMnO_x$, $NiFeO_x$, $NiCoO_x$ ($1 \leq x \leq 4$), and mixtures thereof.

5. The PAlB of claim 1, wherein the cathode is carbon mixed with solid oxidants selected from the group consisting of $MnO_2$, $NiO(OH)$, $CuO$, $Fe_2O_3$, $Fe_3O_4$, and mixtures thereof.

6. The PAlB of claim 1, wherein the cathode comprises electrocatalytic metals for the optional internal oxidants selected from the group consisting of copper, nickel, platinum, palladium, iridium, rhodium, and alloys thereof.

7. The PAlB of claim 6, wherein the optional internal oxidants are soluble salts comprising oxidizing anions selected from the group consisting of nitrate ($NO_3^-$), hypochlorite ($ClO^-$), chlorite ($ClO_2^-$), chlorate ($ClO_3^-$), bromate ($BrO_3^-$), iodate ($IO_3^-$), peroxide ($O_2^{2-}$), hydroperoxide ($HOO^-$), perborate ($B_2O_6^{2-}$), persulphate ($S_2O_8^{2-}$), and polysulfides ($S_n^{2-}$, $n=3$-$5$), and cations selected from the group consisting of $Li^+$, $Na^+$, $K^+$ and quaternary ammonium salts, $R^1R^2R^3R^4N^+$, where $R^1$, $R^2$, $R^3$, and $R^4$ are non-ionizable substituents, and mixtures thereof.

8. The PAlB of claim 6, wherein the optional internal oxidant is hydrogen peroxide.

9. A pulsed aluminum battery (PAlB) system comprising:
a) a PAlB, comprising, i) an anode comprising aluminum metal, wherein the aluminum metal is selected from recycled or technical grade aluminum comprising at least 95% of aluminum;

ii) a complex water-based electrolyte comprising bases, facilitators, stabilizers, and optionally internal oxidants, wherein the facilitators and stabilizers are capable of supporting stable pulse mode and allow controlling triggered pulses;

iii) a cathode, b) an external source for triggering controllable pulses, wherein the PAlB system has controlled power output of the PAlB.

10. The PAlB system of claim 9, wherein the external source is an external electric source providing an electric signal for triggering controllable pulses and regulating the power output of the PAlB in pulse frequency modulation mode.

11. The PAlB system of claim 9, wherein the external source is an external chemical initiator comprising triggering catalysts capable of triggering controllable pulses, wherein the triggering catalysts are salts comprising strongly oxidizing anions selected from the group consisting of permanganate ($MnO_4^-$), periodate ($IO_4^-$), ferrate ($FeO_4^{2-}$), and mixtures thereof, and cations selected from the group consisting of $Li^+$, $Na^+$, $K^+$ and quaternary ammonium salts, $R^1R^2R^3R^4N^+$, where $R^1$, $R^2$, $R^3$, and $R^4$ are non-ionizable substituents, and mixtures thereof.

12. The PAlB system of claim 9, wherein the bases are soluble hydroxides comprising cations selected from the group consisting of $Li^+$, $Na^+$, $K^+$ and quaternary ammonium salts, $R^1R^2R^3R^4N^+$, where $R^1$, $R^2$, $R^3$, and $R^4$ are non-ionizable substituents.

13. The PAlB system of claim 9, wherein the facilitators and stabilizers are soluble salts comprising anions selected from the group consisting of chloride ($Cl^-$), hypochlorite ($ClO^-$), sulfate ($SO_4^{2-}$), tetrafluoroborate ($BF_4^-$), perchlorate ($ClO_4^-$), trifluoromethanesulfonate ($CF_3SO_3^-$), metaborate ($BO_2^-$), silicate, ($SiO_3^{2-}$), carbonate ($CO_3^{2-}$), and mixtures thereof, and cations selected from the group consisting of $Li^+$, $Na^+$, $K^+$ and quaternary ammonium salts, $R^1R^2R^3R^4N^+$, where $R^1$, $R^2$, $R^3$, and $R^4$ are non-ionizable substituents, and mixtures thereof.

14. The PAlB system of claim 9, wherein the cathode is air cathode comprising carbon mixed with electrocatalytic metal oxides selected from the group consisting of $MnO_x$, $CoO_x$, $FeO_x$, $LaNiO_x$, $LaMnO_x$, $NiFeO_x$, $NiCoO_x$ ($1 \leq x \leq 4$), and mixtures thereof.

15. The PAlB system of claim 9, wherein the cathode is carbon mixed with solid oxidants selected from the group consisting of $MnO_2$, $NiO(OH)$, $CuO$, $Fe_2O_3$, $Fe_3O_4$, and mixtures thereof.

16. The PAlB system of claim 9, wherein the cathode comprises electrocatalytic metals for the optional internal oxidants selected from the group consisting of copper, nickel, platinum, palladium, iridium, rhodium, and alloys thereof.

17. The PAlB system of claim 16, wherein the optional internal oxidants are soluble salts comprising oxidizing anions selected from the group consisting of hypochlorite ($ClO^-$), chlorite ($ClO_2^-$), chlorate ($ClO_3^-$), bromate ($BrO_3^-$), iodate ($IO_3^-$), peroxide ($O_2^{2-}$), hydroperoxide ($HOO^-$), perborate ($B_2O_6^{2-}$), and persulphate ($S_2O_8^{2-}$), and cations selected from the group consisting of $Li^+$, $Na^+$, $K^+$ and quaternary ammonium salts, $R^1R^2R^3R^4N^+$, where $R^1$, $R^2$, $R^3$, and $R^4$ are non-ionizable substituents, and mixtures thereof.

18. The PAlB system of claim 16, wherein the optional internal oxidant is hydrogen peroxide.

\* \* \* \* \*